US008009173B2

(12) United States Patent
Matthews

(10) Patent No.: US 8,009,173 B2
(45) Date of Patent: *Aug. 30, 2011

(54) RACK INTERFACE POD WITH INTELLIGENT PLATFORM CONTROL

(75) Inventor: Ken Matthews, Huntsville, AL (US)

(73) Assignee: Avocent Huntsville Corporation, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/882,557

(22) Filed: Aug. 2, 2007

(65) Prior Publication Data

US 2008/0052442 A1    Feb. 28, 2008

Related U.S. Application Data

(60) Provisional application No. 60/836,664, filed on Aug. 10, 2006.

(51) Int. Cl.
G06F 13/14    (2006.01)
G06F 15/173   (2006.01)
G06F 13/00    (2006.01)

(52) U.S. Cl. .................. 345/520; 709/224; 710/107

(58) Field of Classification Search .................. 345/501, 345/502, 520; 710/1, 5, 100, 107; 709/201, 709/217, 223, 224
See application file for complete search history.

(56) References Cited

U.S. PATENT DOCUMENTS

| 2,667,553 | A | 1/1954 | Moorhead et al. |
|---|---|---|---|
| 2,870,287 | A | 1/1959 | Corbitt et al. |
| 3,562,756 | A | 2/1971 | Kuo et al. |
| 3,634,830 | A | 1/1972 | Baskin |
| 3,774,158 | A | 11/1973 | Clark |
| 3,955,188 | A | 5/1976 | Viswanathan |
| 4,078,249 | A | 3/1978 | Lelke et al. |
| 4,081,797 | A | 3/1978 | Olson |
| 4,103,252 | A | 7/1978 | Bobick |
| 4,150,429 | A | 4/1979 | Ying |
| 4,243,984 | A | 1/1981 | Ackley et al. |
| 4,313,176 | A | 1/1982 | Cecil |
| 4,395,610 | A | 7/1983 | Downs et al. |
| 4,442,321 | A | 4/1984 | Stehman |

(Continued)

FOREIGN PATENT DOCUMENTS

EP    0174099 A2    3/1986

(Continued)

OTHER PUBLICATIONS

International Search Report and Written Opinion mailed Aug. 26, 2008 in PCT/US07/17489.

(Continued)

*Primary Examiner* — Joni Hsu
(74) *Attorney, Agent, or Firm* — Davidson Berquist Jackson & Gowdey, LLP

(57) ABSTRACT

Rack Interface Pods can be augmented with non-KVM (keyboard, video and mouse) functionality that can enable greater analysis of the state of the computer to which the RIP is attached. A RIP can be augmented to include a non-KVM input connection (e.g., an Intelligent Platform/Chassis control protocol input) that is used to communicate between the server and the RIP. The RIP can then multiplex the received information with the KVM signals for transmission to a PEM or to an ARI port. Video and computer environment-style data can be multiplexed across a communications medium exiting the RIP such that they can be received by a remote computer.

23 Claims, 14 Drawing Sheets

U.S. PATENT DOCUMENTS

| | | |
|---|---|---|
| 4,479,122 A | 10/1984 | Redman et al. |
| 4,550,386 A | 10/1985 | Hirosawa et al. |
| 4,599,611 A | 7/1986 | Bowker et al. |
| 4,630,284 A | 12/1986 | Cooperman |
| 4,641,262 A | 2/1987 | Bryan et al. |
| 4,665,501 A | 5/1987 | Saldin et al. |
| 4,680,622 A | 7/1987 | Barnes et al. |
| 4,710,917 A | 12/1987 | Tompkins et al. |
| 4,754,326 A | 6/1988 | Kram et al. |
| 4,768,083 A | 8/1988 | Romesburg |
| 4,769,833 A | 9/1988 | Farleigh et al. |
| 4,800,429 A | 1/1989 | Perkins |
| 4,807,184 A | 2/1989 | Shelor |
| 4,814,972 A | 3/1989 | Winter et al. |
| 4,823,256 A | 4/1989 | Bishop et al. |
| 4,879,716 A | 11/1989 | McNally et al. |
| 4,907,079 A | 3/1990 | Turner et al. |
| 4,919,117 A | 4/1990 | Muchisky et al. |
| 4,927,787 A | 5/1990 | Patel |
| 4,927,987 A | 5/1990 | Kirchgessner |
| 4,939,507 A | 7/1990 | Beard et al. |
| 4,941,087 A | 7/1990 | Kap |
| 4,949,169 A | 8/1990 | Lumelsky et al. |
| 4,949,248 A | 8/1990 | Caro |
| 4,953,027 A | 8/1990 | Tong et al. |
| 4,953,159 A | 8/1990 | Hayden et al. |
| 5,029,111 A | 7/1991 | Mansell |
| 5,033,813 A | 7/1991 | Westfall |
| 5,036,484 A | 7/1991 | McCoy et al. |
| 5,043,866 A | 8/1991 | Myre, Jr. |
| 5,051,720 A | 9/1991 | Kittirutsunetorn |
| 5,117,225 A | 5/1992 | Wang |
| 5,121,486 A | 6/1992 | Kurihara et al. |
| 5,128,766 A | 7/1992 | Choi |
| 5,166,674 A | 11/1992 | Baum et al. |
| 5,188,542 A | 2/1993 | Ballman |
| 5,192,226 A | 3/1993 | Wang |
| 5,214,785 A | 5/1993 | Fairweather |
| 5,220,380 A | 6/1993 | Hirata et al. |
| 5,222,212 A | 6/1993 | Johary et al. |
| 5,227,666 A | 7/1993 | Asprey |
| 5,230,066 A | 7/1993 | Morimi |
| 5,247,364 A | 9/1993 | Banker et al. |
| 5,247,615 A | 9/1993 | Mori et al. |
| 5,257,390 A | 10/1993 | Asprey |
| 5,260,532 A | 11/1993 | Tinder et al. |
| 5,260,778 A | 11/1993 | Kauffman et al. |
| 5,261,079 A | 11/1993 | Celi, Jr. |
| 5,268,676 A | 12/1993 | Asprey et al. |
| 5,272,525 A | 12/1993 | Borchardt et al. |
| 5,280,583 A | 1/1994 | Nakayama et al. |
| 5,283,639 A | 2/1994 | Esch et al. |
| 5,287,461 A | 2/1994 | Moore |
| 5,297,262 A | 3/1994 | Cox et al. |
| 5,299,306 A | 3/1994 | Asprey |
| 5,301,028 A | 4/1994 | Banker et al. |
| 5,317,391 A | 5/1994 | Banker et al. |
| 5,327,156 A | 7/1994 | Masukane et al. |
| 5,341,477 A | 8/1994 | Pitkin et al. |
| 5,347,646 A | 9/1994 | Hirosawa et al. |
| 5,349,675 A | 9/1994 | Fitzgerald et al. |
| 5,353,409 A | 10/1994 | Asprey et al. |
| 5,357,276 A | 10/1994 | Banker et al. |
| 5,357,420 A | 10/1994 | Gohi |
| 5,367,571 A | 11/1994 | Bowen et al. |
| 5,381,477 A | 1/1995 | Beyers, II et al. |
| 5,386,574 A | 1/1995 | Asprey |
| 5,392,400 A | 2/1995 | Berkowitz et al. |
| 5,396,593 A | 3/1995 | Mori et al. |
| 5,421,009 A | 5/1995 | Platt |
| 5,430,850 A | 7/1995 | Papadopoulos et al. |
| 5,440,618 A | 8/1995 | Riegel et al. |
| 5,440,632 A | 8/1995 | Bacon et al. |
| 5,448,697 A | 9/1995 | Parks et al. |
| 5,465,105 A | 11/1995 | Shatas et al. |
| 5,477,262 A | 12/1995 | Banker et al. |
| 5,485,221 A | 1/1996 | Banker et al. |
| 5,486,868 A | 1/1996 | Shyu et al. |
| 5,486,869 A | 1/1996 | Cooper |
| 5,489,947 A | 2/1996 | Cooper |
| 5,499,377 A | 3/1996 | Lee |
| 5,502,499 A | 3/1996 | Birch et al. |
| 5,504,522 A | 4/1996 | Setogawa |
| 5,519,874 A | 5/1996 | Yamagishi et al. |
| 5,526,024 A | 6/1996 | Gaglianello et al. |
| 5,534,942 A | 7/1996 | Beyers et al. |
| 5,535,036 A | 7/1996 | Grant |
| 5,537,548 A | 7/1996 | Fin et al. |
| 5,539,822 A | 7/1996 | Lett |
| 5,553,287 A | 9/1996 | Bailey et al. |
| 5,573,425 A | 11/1996 | Morisawa et al. |
| 5,577,210 A | 11/1996 | Abdous et al. |
| 5,579,057 A | 11/1996 | Banker et al. |
| 5,579,087 A | 11/1996 | Salgado |
| 5,581,303 A | 12/1996 | Djabbari et al. |
| 5,583,993 A | 12/1996 | Foster et al. |
| 5,592,551 A | 1/1997 | Lett et al. |
| 5,603,060 A | 2/1997 | Weinberger et al. |
| 5,604,509 A | 2/1997 | Moore et al. |
| 5,606,604 A | 2/1997 | Rosenblatt et al. |
| 5,608,872 A | 3/1997 | Schwartz et al. |
| 5,617,547 A | 4/1997 | Feeney et al. |
| 5,637,013 A | 6/1997 | Weber |
| 5,638,516 A | 6/1997 | Duzett et al. |
| 5,642,153 A | 6/1997 | Chaney et al. |
| 5,657,414 A | 8/1997 | Lett et al. |
| 5,674,003 A | 10/1997 | Anderson et al. |
| 5,689,671 A | 11/1997 | Stromberg |
| 5,701,161 A | 12/1997 | Williams et al. |
| 5,708,897 A | 1/1998 | Manabe et al. |
| 5,708,961 A | 1/1998 | Hylton et al. |
| 5,715,515 A | 2/1998 | Akins et al. |
| 5,719,622 A | 2/1998 | Conway |
| 5,721,828 A | 2/1998 | Frisch |
| 5,721,842 A | 2/1998 | Beasley et al. |
| 5,724,525 A | 3/1998 | Beyers et al. |
| 5,732,212 A | 3/1998 | Perholtz et al. |
| 5,740,246 A | 4/1998 | Saito |
| 5,742,677 A | 4/1998 | Pinder et al. |
| 5,742,718 A | 4/1998 | Harman et al. |
| 5,744,754 A | 4/1998 | Strang et al. |
| 5,768,224 A | 6/1998 | Tanaka et al. |
| 5,774,859 A | 6/1998 | Houser et al. |
| 5,775,939 A | 7/1998 | Brown |
| 5,792,986 A | 8/1998 | Lee |
| 5,801,789 A | 9/1998 | Zeidler et al. |
| 5,812,784 A | 9/1998 | Watson et al. |
| 5,828,843 A | 10/1998 | Grimm et al. |
| 5,850,209 A | 12/1998 | Lemke et al. |
| 5,864,535 A | 1/1999 | Basilico |
| 5,884,096 A | 3/1999 | Beasley et al. |
| 5,917,552 A | 6/1999 | Van Court |
| 5,926,509 A | 7/1999 | Stewart et al. |
| 5,929,386 A | 7/1999 | Hornick |
| 5,937,176 A | 8/1999 | Beasley et al. |
| 6,009,490 A | 12/1999 | Fukui et al. |
| 6,041,182 A | 3/2000 | Hart et al. |
| 6,067,545 A | 5/2000 | Wolff |
| 6,070,253 A | 5/2000 | Tavallaei et al. |
| 6,073,188 A | 6/2000 | Fleming |
| 6,104,414 A | 8/2000 | Odryna et al. |
| 6,112,264 A | 8/2000 | Beasley et al. |
| 6,119,146 A | 9/2000 | Heller et al. |
| 6,128,660 A | 10/2000 | Grimm et al. |
| 6,137,455 A | 10/2000 | Duo |
| 6,150,997 A | 11/2000 | Asprey |
| 6,185,643 B1 | 2/2001 | Kirshtein et al. |
| 6,192,433 B1 | 2/2001 | Chan et al. |
| 6,256,014 B1 | 7/2001 | Thomas et al. |
| 6,304,895 B1 | 10/2001 | Schneider et al. |
| 6,321,366 B1 | 11/2001 | Tseng et al. |
| 6,324,605 B1 | 11/2001 | Rafferty et al. |
| 6,329,616 B1 | 12/2001 | Lee |
| 6,330,602 B1 | 12/2001 | Law et al. |
| 6,333,750 B1 | 12/2001 | Odryna et al. |
| 6,343,080 B1 | 1/2002 | Kondo |
| 6,345,323 B1 | 2/2002 | Beasley et al. |

| | | |
|---|---|---|
| 6,373,476 B1 | 4/2002 | Dalgleish et al. |
| 6,378,009 B1 | 4/2002 | Pinkston, II et al. |
| 6,378,014 B1 | 4/2002 | Shirley |
| 6,388,658 B1 | 5/2002 | Ahern et al. |
| 6,449,866 B1 | 9/2002 | Murray |
| 6,482,042 B1 | 11/2002 | Tupper |
| 6,498,890 B1 | 12/2002 | Kimminau |
| 6,521,836 B1 | 2/2003 | Simonazzi |
| 6,557,170 B1 | 4/2003 | Wilder et al. |
| 6,567,869 B2 | 5/2003 | Shirley |
| 6,580,044 B2 | 6/2003 | Ogawa et al. |
| 6,601,124 B1 | 7/2003 | Blair |
| 6,609,034 B1 | 8/2003 | Behrens et al. |
| 6,615,272 B1 | 9/2003 | Ambrose |
| 6,618,774 B1 | 9/2003 | Dickens et al. |
| 6,623,295 B2 | 9/2003 | Deladurantaye, III |
| 6,633,934 B1 | 10/2003 | Thornton |
| 6,633,935 B1 | 10/2003 | Chan et al. |
| 6,671,756 B1 | 12/2003 | Thomas et al. |
| 6,672,896 B1 | 1/2004 | Li |
| 6,697,905 B1 | 2/2004 | Bealkowski |
| 6,748,005 B1 | 6/2004 | Riazi et al. |
| 6,830,340 B2 * | 12/2004 | Olson et al. ............ 353/30 |
| 6,886,055 B2 | 4/2005 | Heller et al. |
| 6,931,458 B2 * | 8/2005 | Bolian et al. ............ 710/15 |
| 6,983,340 B1 | 1/2006 | Hermanson et al. |
| 7,113,978 B2 | 9/2006 | Beasley et al. |
| 7,136,946 B2 | 11/2006 | Shirley |
| 7,228,345 B2 * | 6/2007 | Larson et al. .......... 709/222 |
| 7,305,494 B2 | 12/2007 | Lee |
| 7,321,943 B2 | 1/2008 | Shirley |
| 7,783,820 B2 | 8/2010 | Shelton et al. |
| 2001/0034157 A1 | 10/2001 | DeLadurantaye, III |
| 2001/0044843 A1 | 11/2001 | Bates et al. |
| 2001/0053627 A1 | 12/2001 | Armistead et al. |
| 2002/0081907 A1 | 6/2002 | Olson et al. |
| 2002/0143996 A1 | 10/2002 | Odryna et al. |
| 2003/0058248 A1 * | 3/2003 | Hochmuth et al. ........ 345/537 |
| 2003/0123677 A1 | 7/2003 | Tran |
| 2003/0188049 A1 | 10/2003 | Dickens |
| 2004/0001323 A1 | 1/2004 | Chen |
| 2004/0044822 A1 | 3/2004 | Chen |
| 2004/0066790 A1 | 4/2004 | Valavi et al. |
| 2005/0091304 A1 * | 4/2005 | Trayler ................ 709/200 |
| 2005/0144434 A1 * | 6/2005 | Taylor et al. .............. 713/2 |
| 2006/0031447 A1 | 2/2006 | Holt et al. |
| 2006/0085690 A1 * | 4/2006 | Bolen et al. .............. 714/39 |
| 2006/0123150 A1 * | 6/2006 | Iwai et al. ............... 710/15 |
| 2006/0262226 A1 | 11/2006 | Odryna et al. |
| 2007/0033265 A1 | 2/2007 | Anderson et al. |
| 2007/0094426 A1 * | 4/2007 | Chiang et al. ............ 710/73 |
| 2007/0219673 A1 * | 9/2007 | Wang .................... 701/1 |

FOREIGN PATENT DOCUMENTS

| | | |
|---|---|---|
| EP | 0 430 673 | 6/1991 |
| EP | 1075111 | 2/2001 |
| GB | 2347246 | 8/2000 |
| GB | 2350039 | 11/2000 |
| JP | H10-91300 | 4/1998 |
| JP | 2000-115591 | 4/2000 |
| WO | WO 87/00317 | 1/1987 |
| WO | WO 94/19749 | 9/1994 |
| WO | WO 95/01055 | 1/1995 |
| WO | WO 96/17286 | 6/1996 |
| WO | WO 97/08625 | 3/1997 |
| WO | WO 99/10801 | 3/1999 |
| WO | WO 00/11559 | 3/2000 |
| WO | WO 00/17766 A2 | 3/2000 |
| WO | WO 00/68813 | 11/2000 |
| WO | WO 01/84291 | 11/2001 |

OTHER PUBLICATIONS

DeKerf, T and Davis, Gary D., "The Keyboard/Video Switch White Paper: A Close Look at Modern Keyboard/Video Switching", Tron International Inc. and the WorkCenter Corporation, 1995.
European Search Report in European patent application No. 00944753.3, mailed Jan. 8, 2007.
Installation Notes for RCI Burn-in Master (BM10), Raritan Computer, Apr. 11, 1989.
International Search Report of PCT/US00/16972 mailed Sep. 25, 2000.
Rose Electronics Product Catalog, pp. 10, 11, 24-27, Jun. 1993.
Search Report and Written Opinion mailed Apr. 21, 2008 in International Application No. PCT/US2007/006845.
U.S. Appl. No. 11/523,582—Jun. 6, 2009 PTO Office Action.
Search Report and Written Opinion mailed Aug. 26, 2008 in PCT Appln. No. PCT/US2007/017489.
EP Appln. No. 05800801.2—Dec. 28, 2008 EPO Extended European Search Report.
IL Appln. No. 182065—May 17, 2010 Israeli Patent Office Notice of Deficiencies w/English translation.
Johnson R. C. et al.: "Antenna Engineering Handbook, Passage" Jan. 1, 1975, Antenna Engineering Handbook, New York, McGraw-Hill, US, pp. 14.14-14.24, XP002218377.
CA Appln. No. 2,382,403—Dec. 8, 2009 CIPO Office Action.
EPO Office Action dated Jan. 29, 2009 in EPO Application No. 00 959 375.7.
JP Appln. No. 2001-580647—Feb. 16, 2010 JPO Office Action.
Supplemental Search Report dated May 29, 2008 in EPO Application No. 00 959 375.7.
U.S. Appl. No. 11/523,582—Oct. 13, 2010 PTO Office Action.
U.S. Appl. No. 11/878,390—Jun. 25, 2010 PTO Office Action.
U.S. Appl. No. 11/987,091—Sep. 13, 2010 PTO Office Action.
Bernstein, Control Data Center Servers, Systems Management, pp. 99-101, Dell Copyright 2004 (October).
CA Appln. No. 2,440,246—Sep. 24, 2004 CIPO Office Action.
European Supplementary Search Report mailed Dec. 6, 2010 in EP Appln. No. 02757837.6.
Kimara Andreas, "KVM Switch Solutions," Mar. 1, 2001, Network Technologies Inc., pp. 1-38.
Office Action issued Apr. 25, 2007 in Japanese patent application No. 2002-578172, with English translation.
Office Action mailed Apr. 18, 2007 in Japanese Patent Application No. 2003-524097, with translation (English).
PCT International Preliminary Examination Report in application PCT/US2002/009595 dated Dec. 5, 2002.
PCT International Search Report in application PCT/US2002/009595 mailed Jun. 13, 2002.
Supplementary Seach Report mailed Nov. 30, 2010 in EP Appln. No. 07753471.7.
U.S. Appl. No. 11/523,582—Aug. 14, 2008 PTO Office Action.
U.S. Appl. No. 11/523,582—Apr. 22, 2011 PTO Office Action.

* cited by examiner

RACK INTERFACE POD WITH INTELLIGENT PLATFORM CONTROL

CROSS-REFERENCE TO CO-PENDING APPLICATIONS

This application claims priority to U.S. Provisional Application Ser. No. 60/836,664 filed on Aug. 10, 2006, the entire contents of which are herein incorporated by reference. The present application is related to U.S. application Ser. No. 11/123,075 entitled "Computer interface module", filed May 6, 2005, which is a continuation of U.S. application Ser. No. 09/951,774 which claims priority to U.S. Provisional Patent Application Ser. No. 60/279,461. The contents of those applications are incorporated herein by reference in their entirety.

FIELD OF INVENTION

The present application is directed to a method of utilizing at least one of the Intelligent Platform/Chassis control protocols (e.g., protocols using one of the Intelligent Platform Management Interface, the Intelligent Platform Management Bus, and the Intelligent Chassis Management Bus) between a computer and an intelligent network peripheral (e.g., a keyboard/video/mouse (KVM) switch) via a Rack Interface Pod (RIP) or a similar device.

DISCUSSION OF THE BACKGROUND

As illustrated in FIG. 1, a known Rack Interface Pod (RIP) 100 (e.g., as described in the above-referenced applications) can be provided for receiving video signals from a server computer 120, such as a rack-mounted server, and providing the video signals to a remote user at a remote computer 190 via (among possibly other things) a local area network (LAN) or Wide Area Network (WAN) 195. The analog signals received by the RIP 100 from the server 120 are transmitted to Avocent Rack Interconnect (ARI) ports on a Rack Connection Manager (RCM) 160 either directly or via a Pod Extension Module (PEM) 140. The RCM 160 includes video processing logic, a supervisory processor, a KVM switch system, and Ethernet interface circuitry.

The remote user of the remote computer 190 connected to the LAN/WAN 195 has the capability of selecting a particular network server (e.g., 120b) among the plurality of network servers (120a ... 120n) through the PEM 140. The remote user is also capable of selecting a particular network server (e.g., 120o, 120p or 120q) that is directly connected to an ARI-port of the RCM 160. A portion of the circuitry located within the RCM 160 digitizes the KVM signals from a selected network server and forwards the digitized signals to the remote user via the LAN/WAN 195 (optionally through an analog Internet Protocol Video (IPV) Module 180). Likewise, the remote users' keyboard strokes and mouse movements are passed via the LAN/WAN 195 to the processor of the RCM 160 which in-turn passes the signals to the selected network server via (1) PEM 140 in the event the network server is connected to the PEM 140 or (2) directly via an ARI (e.g., in the case of servers 120o, 120p and 120q).

In addition to other possible communications capabilities, such as Ethernet-based and serial-based communication, in servers 120, there now exist a series of control and/or status interfaces known as IPMI (Intelligent Platform Management Interface), such as is detailed in a document entitled "IPMI v2.0 rev 1.0 specification markup for IPMI v2.0/v1.5 errata revision 2." The contents of that document are incorporated herein by reference. The IPMB (Intelligent Platform Management Bus), and ICMB (Intelligent Chassis Management Bus) are also part of the same information. Intel and other manufacturers recently adopted IPMI v2.0 and 1.5, and information about those standards are now publicly available on the Internet.

SUMMARY OF THE INVENTION

Rack Interface Pods (RIPs) or similar devices can be augmented with additional, non-KVM (keyboard, video and mouse) functionality that can enable greater analysis of the state of the computer(s) to which the RIP is attached. For example, a RIP can be augmented to include a non-KVM input connection (e.g., an Intelligent Platform/Chassis control/management protocol input) that is used to communicate between the server and the RIP. The RIP can then multiplex the received information with the KVM signals for transmission to a PEM or to an ARI port. In one embodiment of the present invention, video and computer-environmental-style data are multiplexed across a communications medium exiting the RIP such that they can be received by a remote computer.

BRIEF DESCRIPTION OF THE DRAWINGS

The following description, given with respect to the attached drawings, may be better understood with reference to the non-limiting examples of the drawings, wherein.

DISCUSSION OF THE PREFERRED EMBODIMENTS

Figure 1:
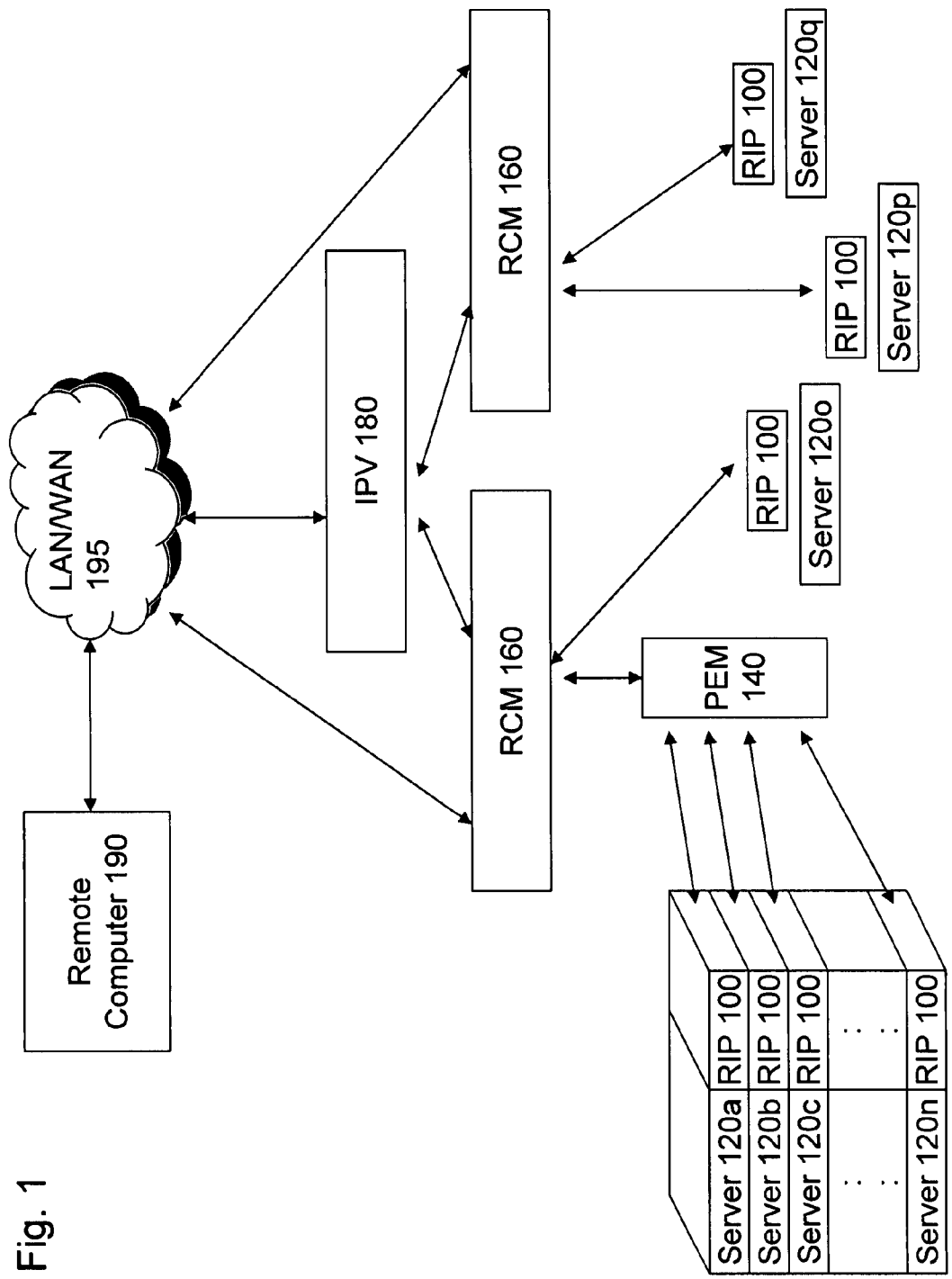
FIG. 1 is a high-level diagram representing a known configuration for using a keyboard/video/mouse (KVM) switch.
Figure 2A:
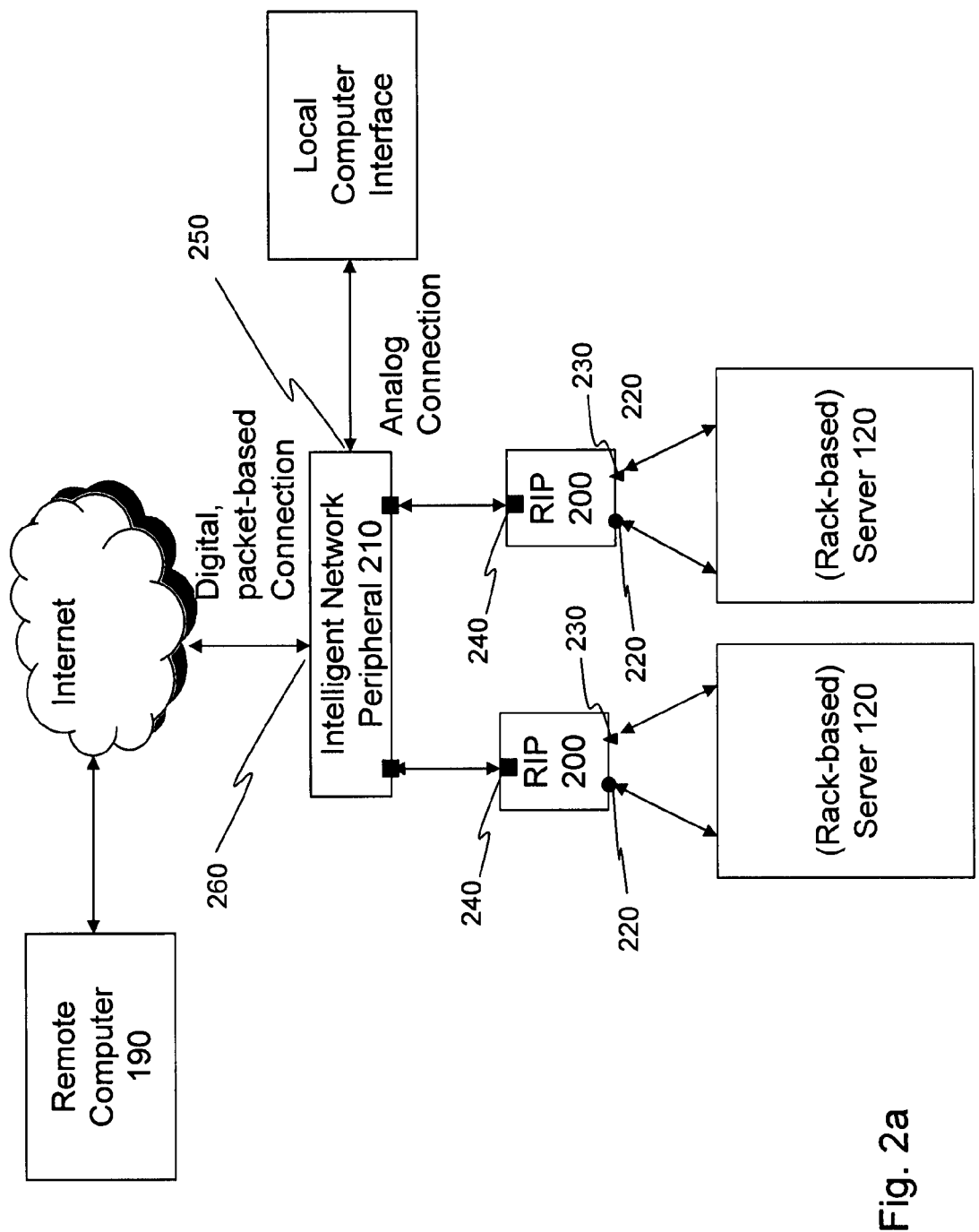
FIG. 2a is a connection-level diagram representing various connections of a Rack Interface Pod (RIP) and an Intelligent Network Peripheral (INP) according to a first exemplary embodiment of the present invention.

Turning to FIG. 2a, a new Rack Interface Pod (RIP) 200 (acting as a video processor) is interposed between a server 120 (either rack-based or stand-alone) and an Intelligent Network Peripheral (INP) 210. The INP 210 may be a separate device or its functionality may be added to in a number of known components, such as a Keyboard/Video/Mouse (KVM) switch, a Rack Connection Manager (RCM), a Pod Extension Module (PEM) or an Internet Protocol Video (IPV) Module. The RIP 200 includes a housing with at least one user interface connector 220 (represented as a circle) and at least one information connector 230 (represented as a triangle) for receiving video and other information, respectively, from a server 120. The user interface connector 220 preferably includes a connector for directly receiving the output of a video adapter which may be analog (e.g., VGA, XGA, SVGA, RGB) or digital. Alternatively, the output of a video adapter may be pre-processed before being received at the user interface connector 220. The connectors can be any one or a combination of connectors for receiving HDMI cables, VGA-style cables, S-video cables, RCA connections and coaxial cables.

The information connector 230 preferably includes a connector for transmitting and/or receiving status or configuration information from a processor (e.g., a baseboard management controller or a satellite management controller) in a server 120 other than the main processor or CPU. (The IPMI standards and any other protocol designed to transmit internal sensor information (e.g., temperature), motherboard status information or chassis/case status information about a computer or set of computers to an exterior of the computer or set of computers will be referred to hereinafter collectively as "Intelligent Standard Interfaces" or ISIs.) The information connector 230 can be a connector for receiving signals supported by any of the Intelligent Standard Interfaces. Such connections include, but are not limited to, serial (e.g., RS-232), I$^2$C, LAN, PCI, sideband, system board, fiber-optic and wireless (e.g., RF or infrared connectors). The information connectors may also be other peripheral-style connectors such as serial (e.g., USB, Serial ATA) connectors, parallel connectors, MIDI connectors, FireWire connectors and any connectors included on a plug-in, add-in or daughter card. The connectors may receive any physical medium including but not limited to, Ethernet-style cable (e.g., CAT-5, CAT-5e, CAT-6) or coaxial cable.

In the exemplary embodiment of FIG. 2a, the INP 210 includes communications ports 240 (represented as squares) for receiving signals from plural RIPs 200. Connected to the communications ports 240 may be any physical medium including but not limited to, Ethernet-style cable (e.g., CAT-5, CAT-5e, CAT-6) or coaxial cable.

Figure 2B:
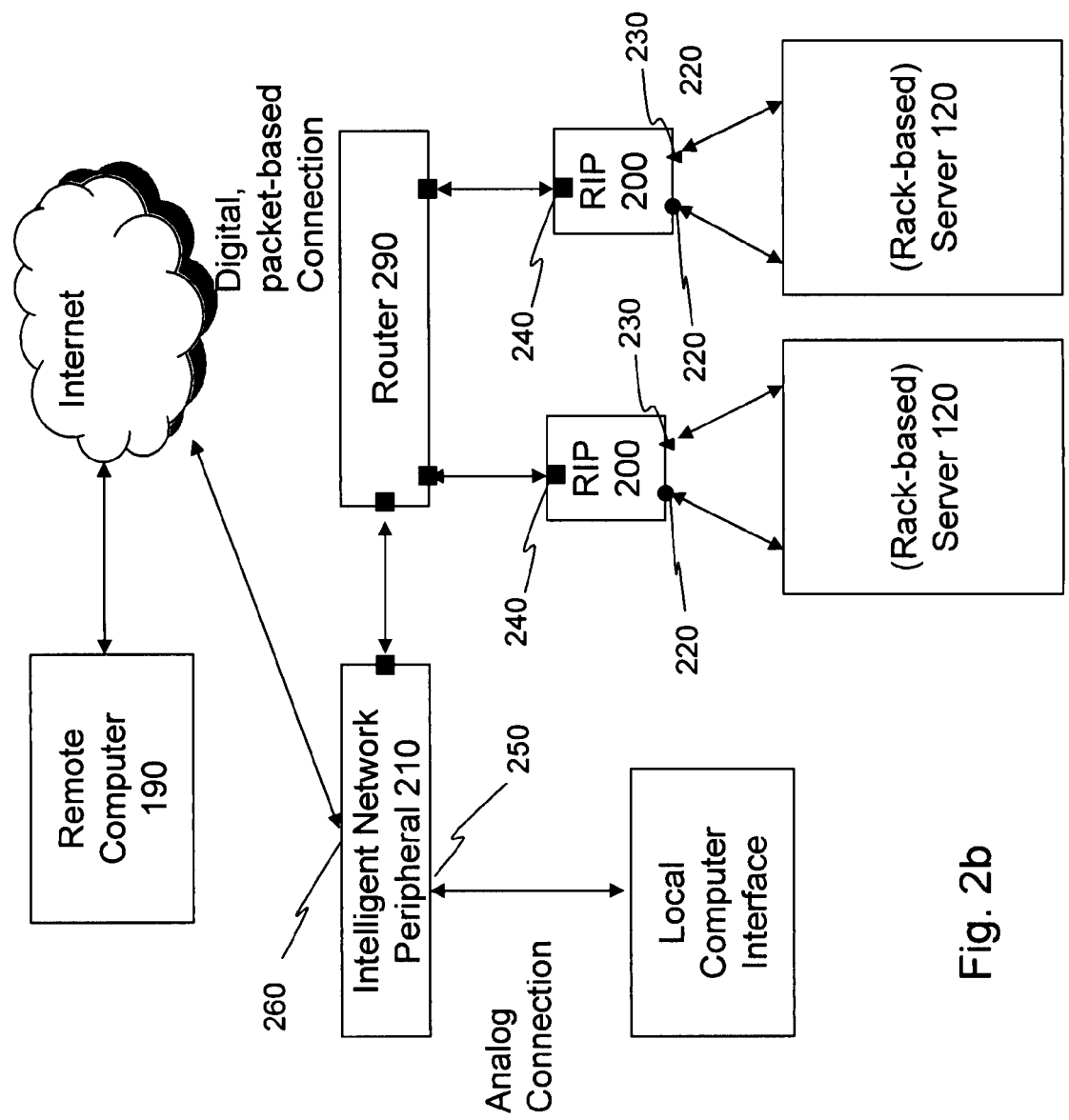
FIG. 2b is a connection-level diagram representing various connections of a Rack Interface Pod (RIP) and an Intelligent Network Peripheral (INP) according to a second exemplary embodiment of the present invention.

In the exemplary embodiment of FIG. 2b, the INP 210 includes only a single communications port 240 connected to a router 290 which routes signals to the INP 210 from plural RIPs 200. In the embodiment of FIG. 2b, the RIPs 200 provide sufficient routing information along with the other signals to enable the RIPs 200 to identify an INP 210 and vice versa. Such routing may be based on reliable or unreliable datagrams and includes, but is not limited to, IP-based routing, ATM-based routing, TCP/IP-based routing and UDP-based communications.

Figure 3:
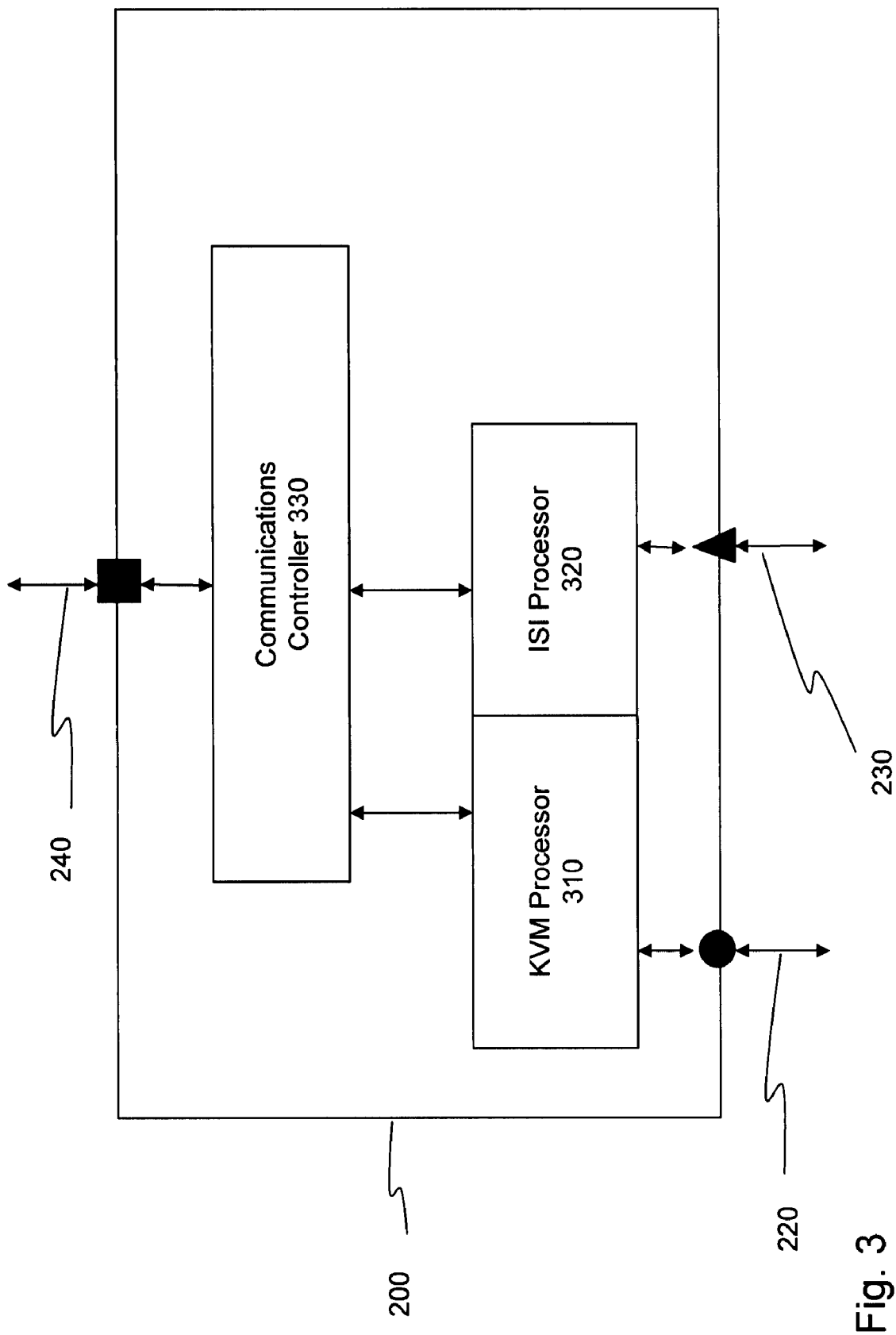
FIG. 3 is a block-diagram representing internals of a RIP according to a first exemplary embodiment of the present invention.

As shown in FIG. 3, the RIP 200 includes a KVM processor 310 which processes any one or a combination of keyboard, video and mouse (KVM) signals corresponding to a server 120. Video signals of the KVM signals are received by a KVM processor 310 over at least one user interface connector 220, as described above. The KVM processor 310 then determines what portion of those signals are to be transmitted to an INP 210 across a communications port 240. The KVM signals to be transmitted are then passed to the communications controller 330 which determines when the KVM signals can be transmitted.

As also shown in FIG. 3, an ISI processor 320 receives ISI information from the server 120. This information may include any information that can be transmitted, queried or set using the IPMI v2.0 rev 1.0 specification or similar protocols. The ISI processor 320 then determines what portion of the ISI signals are to be transmitted to an INP 210 across a communications port 240. The ISI signals to be transmitted are then passed to the communications controller 330 which determines when the ISI signals can be transmitted.

Given that the communications controller 330 may be receiving information to be transmitted from both the KVM processor 310 and ISI processor 320 simultaneously, the communications controller 330 may also include multiplexing logic/programming and/or priority determination logic/programming for deciding which source of information takes priority in transmission. The communications controller 330 may also include priority logic/programming that determines priority based on the type of information being sent. For example, video information may take priority over ISI temperature information when the temperature information is in a "normal" range. However, ISI temperature information may take priority over video information when the ISI information indicates that a temperature is sufficiently out of the "normal" range to be problematic.

The KVM processor 310 and the ISI processor 320 may also include filtering logic/programming that enables those processors to decide the conditions under which information received should be sent to the INP 210 and when it may be discarded. For example, an ISI processor 320 may receive ISI information once a second but may be programmed or configured to transmit that information to the communications controller 330 only once a minute. However, the ISI processor 320 may be programmed or configured to transmit information indicating above normal temperatures to the communications controller 330 without any filtering.

In addition to transmitting information signals to the INP 210, the communications controller 330 may also receive signals from the INP 210. Such signals may include user interface signals such as keyboard and mouse signals that are to be passed on to the KVM processor 310. In the event that the user interface signals are incompatible with the server 120, the KVM processor 310 may also include translation circuitry or programming to convert the user interface signals from a first format to a second, compatible format.

The signals received from the INP 210 may also include ISI signals, e.g., signals for setting parameters within the server 120, signals for authenticating an ISI connection, signals for querying information known to an ISI on-board processor, etc.

Figure 4:
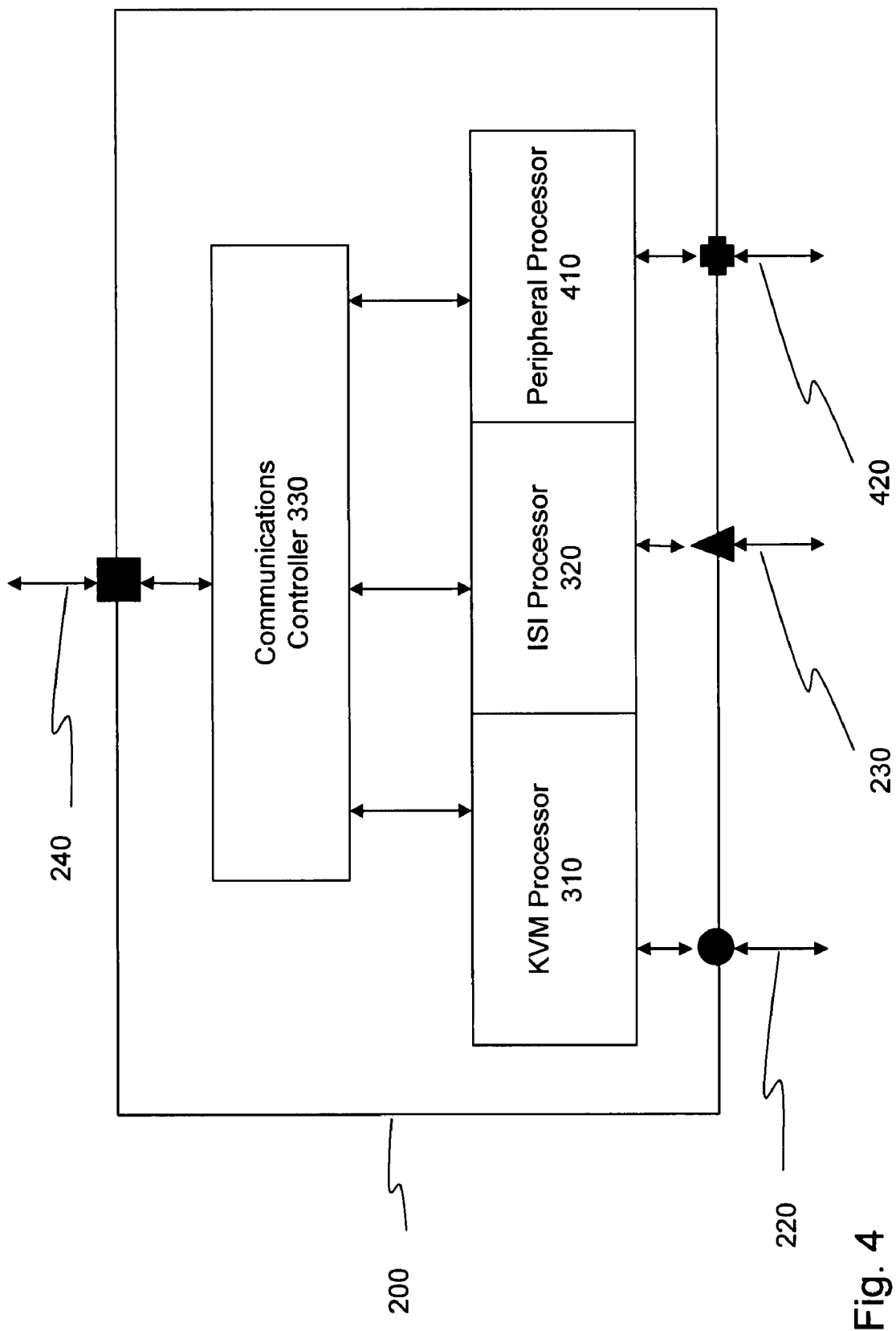
FIG. 4 is a block-diagram representing internals of a RIP according to a second exemplary embodiment of the present invention.

As shown in FIG. 4, in addition to the components of FIG. 3, a RIP 200 may further be configured with a peripheral processor 410 for connecting to a server 120 using a peripheral connector 420 (represented as a cross) such as a USB connector. By including a peripheral connector 420, additional external devices remote from server 120 can be connected to the server 120. Such devices include, but are not limited to, user input devices, mass storage devices, and audio devices. The information exchanged between the server 120 and the remote device is passed to the communications controller 330, where it is multiplexed with the signals from the KVM processor 310 and the ISI processor 320 according to the priorities, if any, established by the configuration of the RIP 200. The multiplexed signals are then transferred on to the INP 210.

Figure 5A:
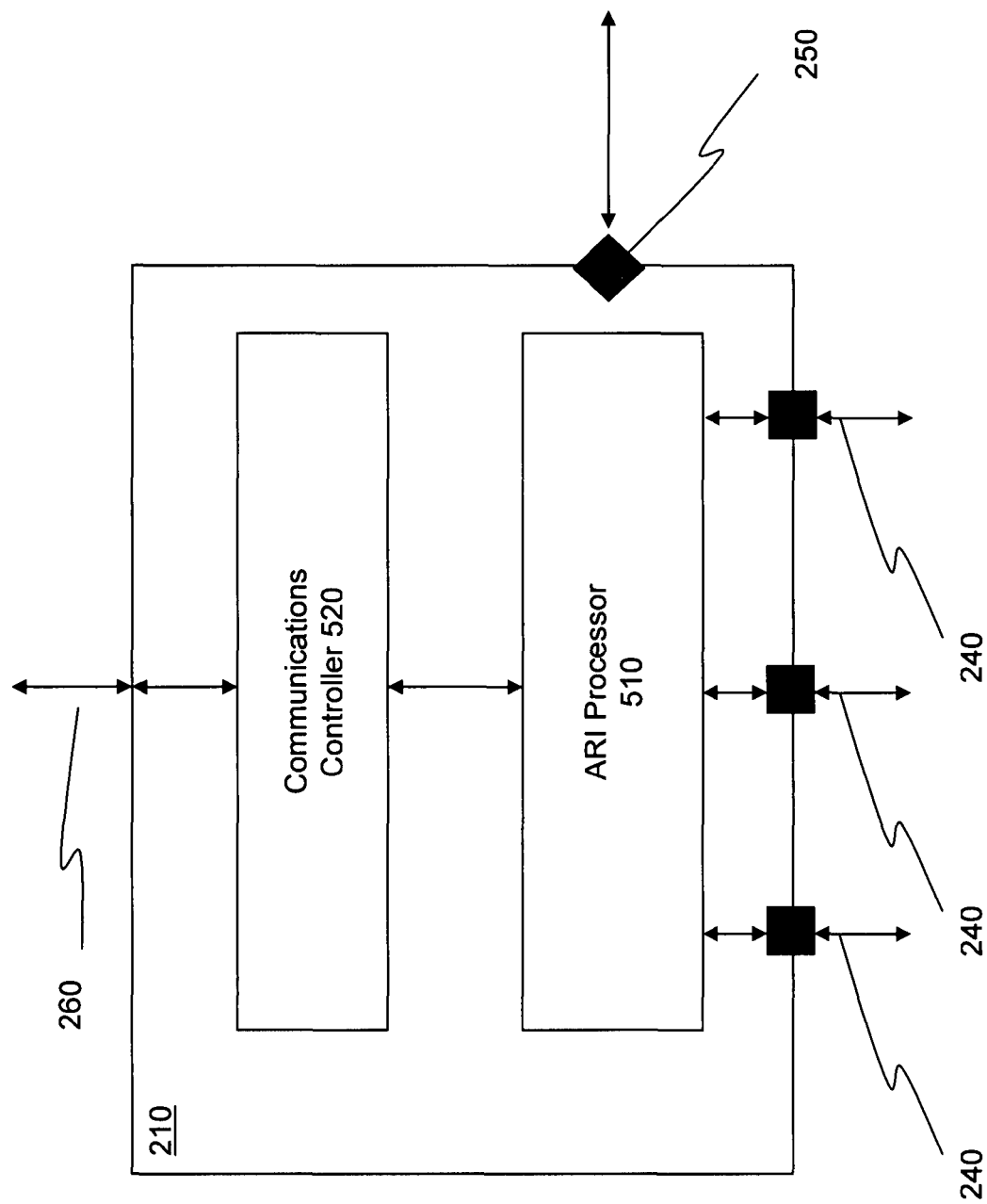
FIG. 5a is a block diagram of an Intelligent Network Peripheral according to a first exemplary embodiment of the present invention.

As shown in FIG. 5*a*, an Intelligent Network Peripheral (INP) 210 includes a housing having therein plural communications ports 240, such as connectors for receiving Ethernet-style cables. The communications ports 240 shown in FIG. 5*a* need not all be the same, and the signals transferred across the communications ports 240 need not all be the same either. For example, some communications ports 240 may be for transmitting digital signals including digitized video and other communications ports 240 may be for transmitting analog signals.

Figure 5B:
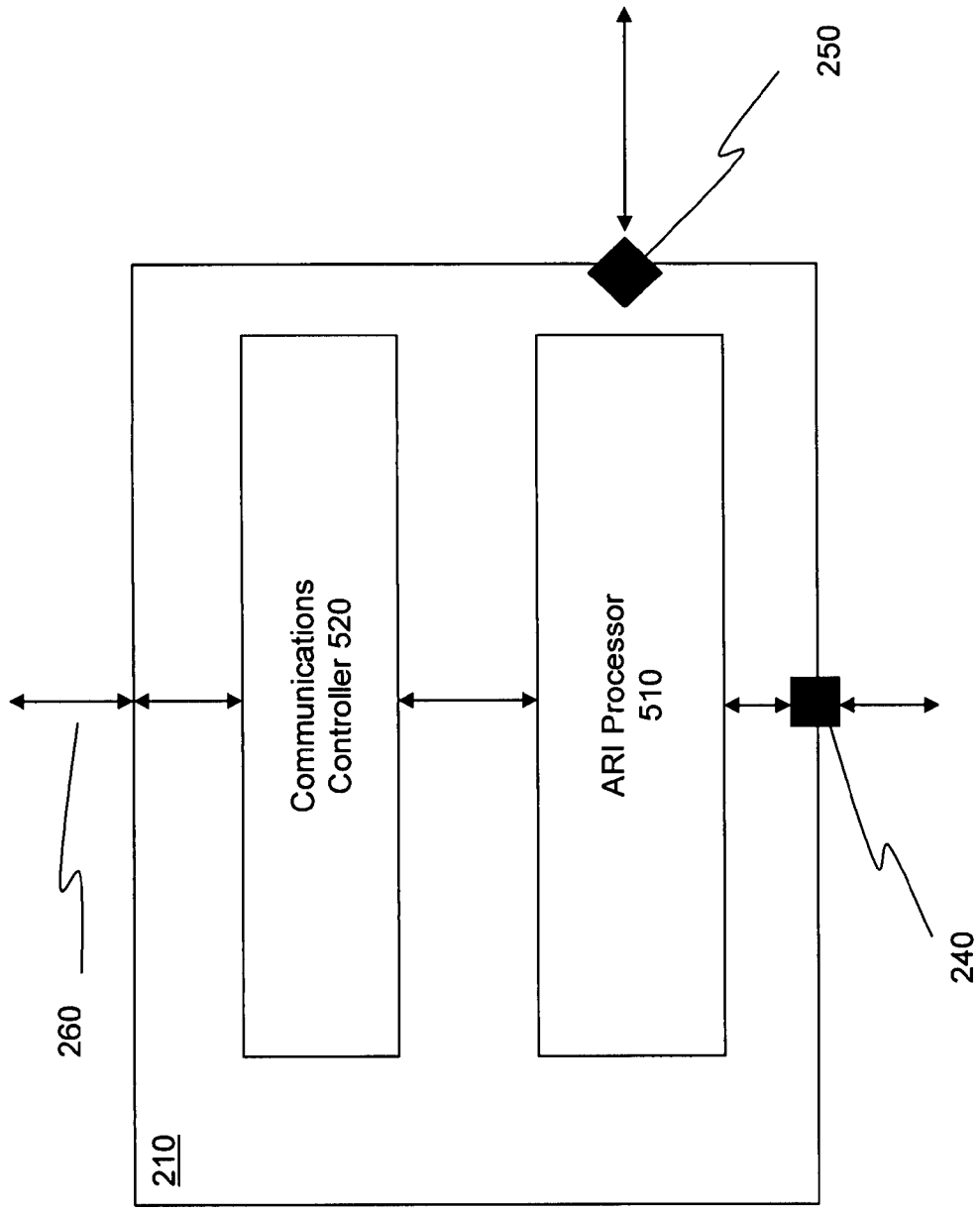
FIG. 5b is a block diagram of an Intelligent Network Peripheral according to a second exemplary embodiment of the present invention.

Alternatively, as shown in FIG. 5*b*, an INP 210 may instead include a housing with a single communications port 240, such as a connector for receiving an Ethernet-style cable, that is connected to a router, such as router 290 shown in FIG. 2*b*. Over at least one communications port 240 multiplexed signals are received at the INP 210 from at least one RIP 200. The multiplexed signals can include user interface signals, computer-environment signals and any other signals that are to be transmitted between the RIP 200 and the INP 210.

In a configuration (such as in FIGS. 2*a* and 2*b*) where a remote computer 190 is monitoring the activities or health of at least one of the servers 120, at least a portion of the signals received by the INP 210 are forwarded on to the remote computer 190 via a communications controller 520 (e.g., an Ethernet controller). Alternatively, in a configuration (such as in FIGS. 2*a* and 2*b*) where a local computer interface (e.g., a computer monitor and at least one peripheral device such as a keyboard or mouse) is monitoring the activities or health of at least one of the servers 120, at least a portion of the signals received by the INP 210 are forwarded on to the local computer interface, e.g., for display on a computer monitor, via a KVM interface connector 250.

In addition to acting as a conduit through which signals can be transmitted between RIPs 200 and a user, the INP 210 can also act as a switch. For example, in the case of a user using the local KVM interface connector 250, signals may be sent from a peripheral device (e.g., a keyboard or mouse) across the KVM interface connector 250 to the INP 210 to indicate which one of the servers 120 is to have its video transmitted to the user over the KVM interface connector 250. Thus, the ARI processor 510 is designed to receive switching commands for controlling which server 120 is considered the "active" server with respect to the KVM interface connector 250. In at least one embodiment, the ARI processor 510 is also capable of selecting which server 120 is considered the "active" server with respect to the remote computer 190. In one embodiment of the present invention, a selection of the "active" server via the KVM interface connector 250 or from the remote computer 190 changes the "active" server for both the KVM interface connector 250 and the remote computer 190. In this way the images seen by two geographically separated users stay synchronized. In an alternate embodiment, a selection of the "active" server via the KVM interface connector 250 or from the remote computer 190 does not change the "active" server for the other interface.

The INP 210 also may be programmed or otherwise configured to act as a filter such that it can filter or prioritize which information is being passed on from the RIPs 200 and servers 120. In the event that the INP 210 detects that the status information from the RIPs 200 is normal, the INP 210 may include circuitry or programming for removing the normal status information from the multiplexed signals, thereby conserving bandwidth, e.g., between the INP 210 and the remote computer 190.

Figure 6:
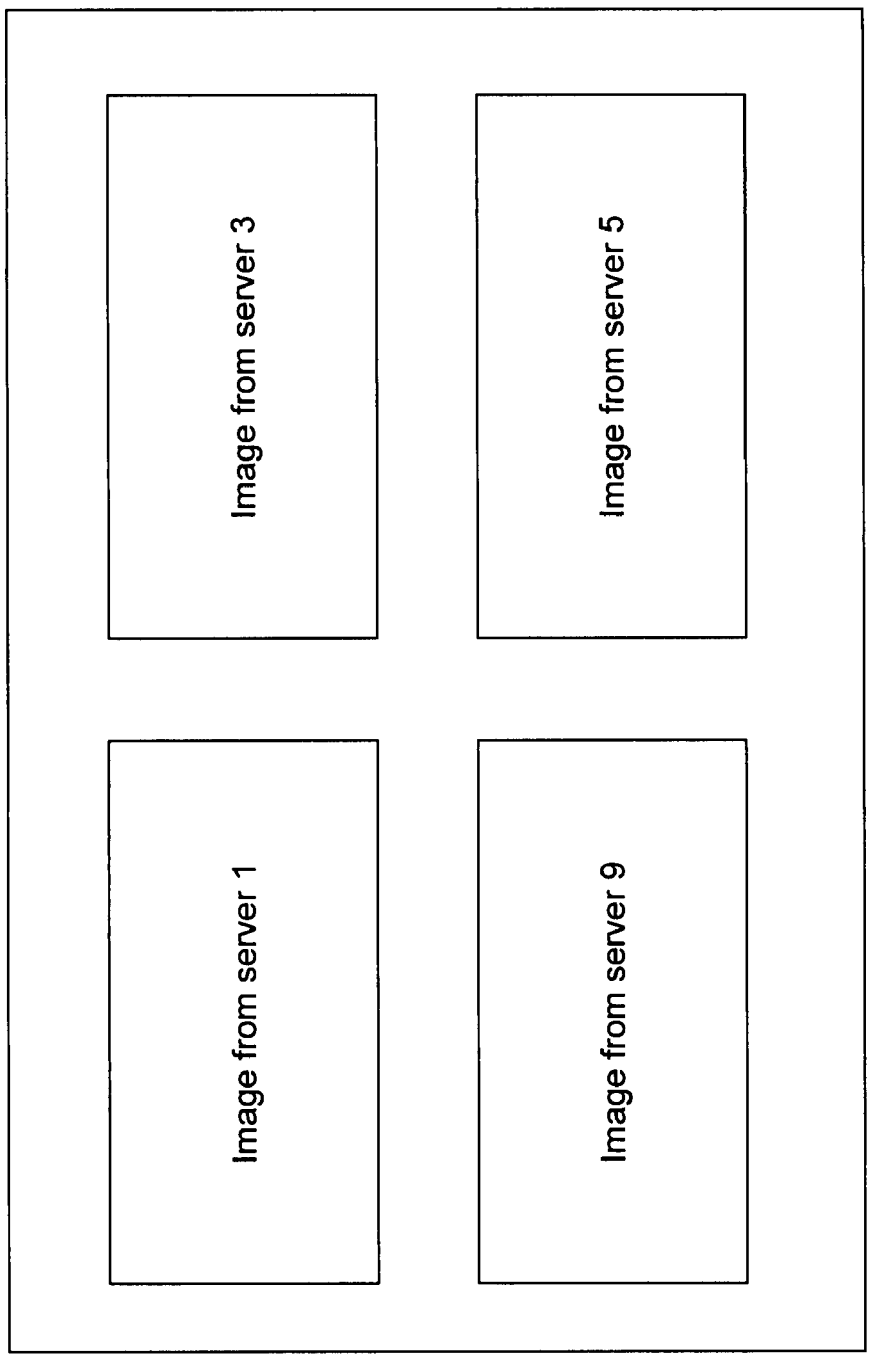
FIG. 6 is a block diagram of a computer monitor showing a set of reduced video images received from a plurality of servers.

The INP 210 may also be programmed or otherwise configured to control the amount of video information being sent to the remote computer 190 or the local computer interface. For example, as shown in FIG. 6, the INP 210 may be configured, using a selection made by a peripheral device at a remote computer 190 or across a KVM interface connector 250, to send a subset (e.g., every second or fourth pixel) of the video produced at plural of the servers 120 such that a set of lower resolution images can be displayed simultaneously on a single computer monitor. In the event of a particular server needing additional attention (e.g., as determined by an ISI message or status, or as determined by a user reviewing the video of one of the lower resolution images), the user can select (e.g., using a peripheral device) which of the servers is to have its video shown at a higher resolution (e.g., full-screen).

The INP 210 may also be programmed or otherwise configured to control the access to the ISI interfaces of the servers 120. For example, the INP 210 may be configured to store (e.g., in a database or configuration file) authentication information (e.g., passwords) for accessing the ISI processors. The INP 210 may be configured to store (e.g., in a database or configuration file) authentication information for users who wish to access the ISI processors or configuration information in the remote servers 120. A user then could authenticate itself to the INP 210 (e.g., by providing a user password matching a password in a database or configuration file in the INP 210) and ask the INP 210 to send the corresponding server-specific authentication information (stored in the same or in a different database or configuration file of the INP 210) on to the corresponding server 120. Alternatively, the authentication information sent by a user may be transferred to the server without an intermediate translation of authentication information by the INP 210.

In one embodiment of the present invention, the information passed between the INP 210 and the remote computer 190 is encrypted but the information passed between the INP 210 and the RIP 200 is not. Alternatively, the information passed between the INP 210 and the remote computer 190 is encrypted, as is the information passed between the INP 210 and the RIP 200, but the information passed between the RIP 200 and the server 120 is unencrypted. Alternatively, the information passed between the remote computer and the server is encrypted along the entire path between them. By using encryption along a subset of the path, a complexity of the devices closer to the servers may be reduced because they do not have to be able to perform encryption or decryption. The information security on the unencrypted links (e.g., between the RIP 200 and the server 120) is instead based on physical security preventing access to those media.

Figure 7:
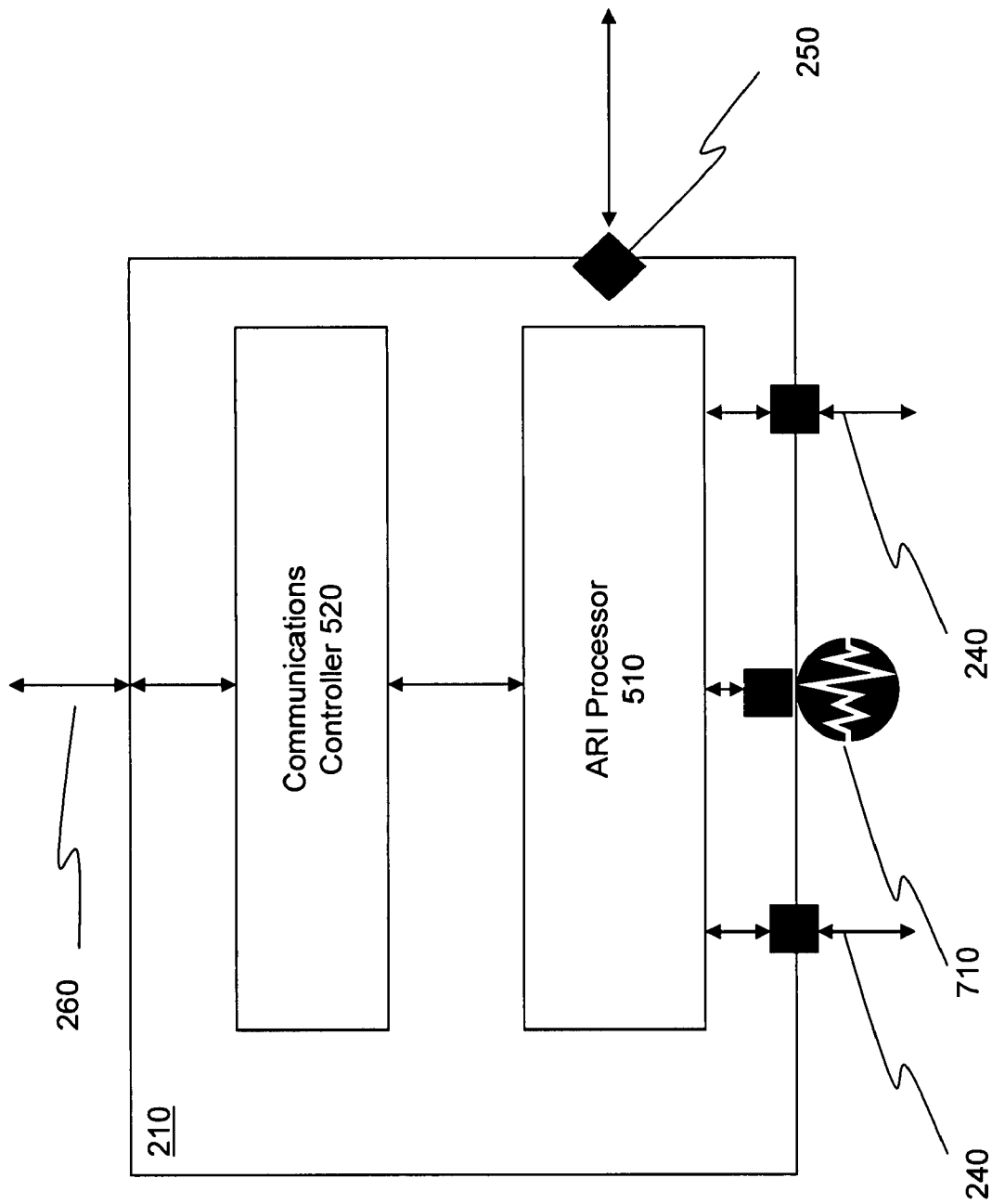
FIG. 7 is a block-diagram representing internals of a RIP according to a third exemplary embodiment of the present invention.
Figure 8:
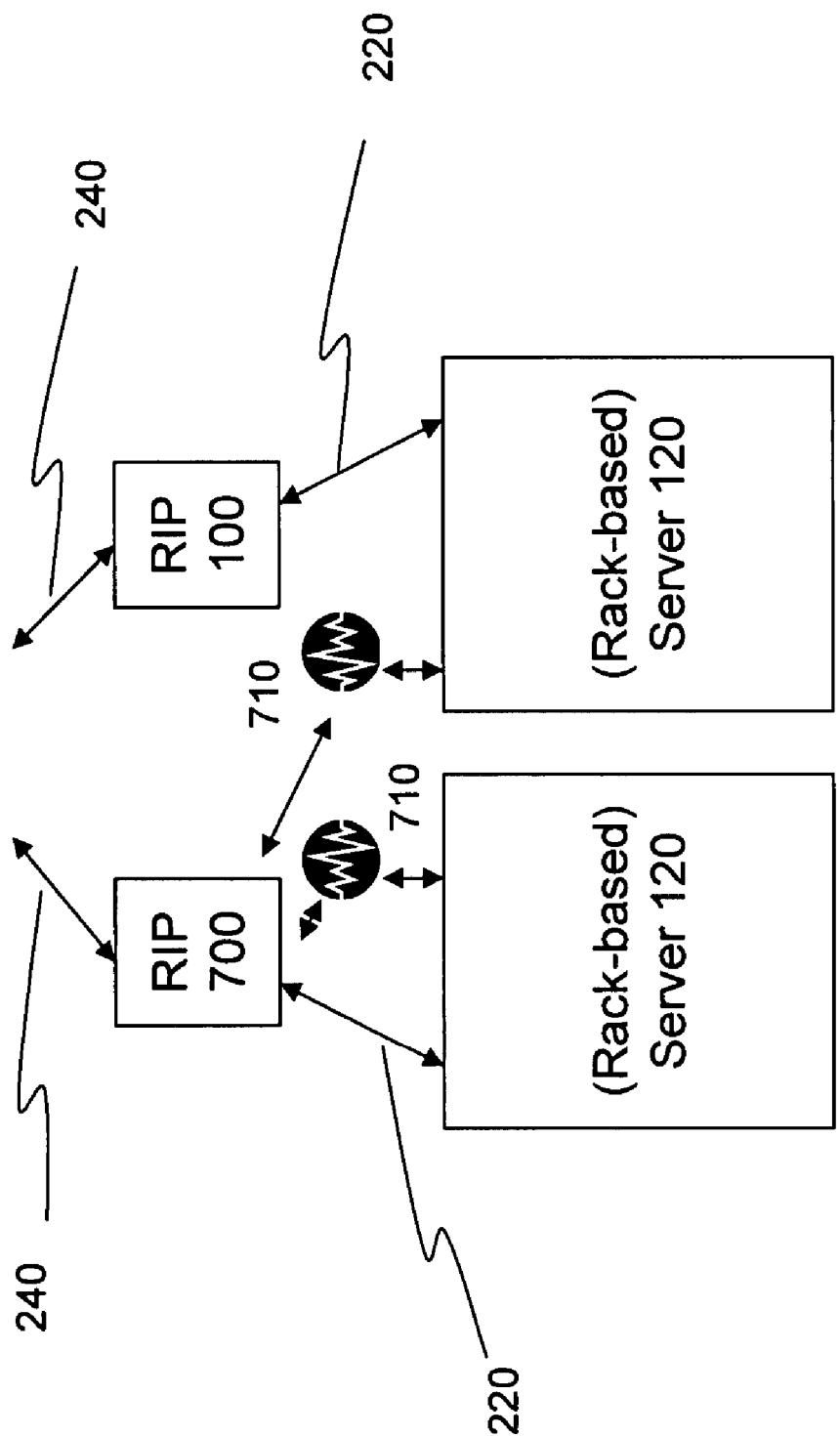
FIG. 8 is a connection-level diagram representing various connections of a RIP having a wireless connector when used with a RIP that does not include an information connector.

Instead of a RIP 200 including an information connector 230 for a wired connection, in an alternate embodiment, as shown in FIG. 7, a RIP 700 instead includes a connector (e.g., a connection point) for connecting to a wireless interface (e.g., an antenna) for receiving wireless electromagnetic radiation 710 (e.g., radio-wave-based or infrared-based signals). In such a case, the ISI-based processor may not require a separate connection or cable and can instead simply transmit wirelessly to a RIP 700. In such a wireless configuration, the RIP 700 can serve as an information multiplexer for a single server 120 or can multiplex information from plural ISI-based processors and video from one server 120. In such a configuration, there may only need to be one RIP 700 per rack or per several servers 120, as shown in FIG. 8. However, in such a configuration, the INP 210 may need to be configured to know the correspondence between the received video signals and the ISI-based processors.

Figure 9:
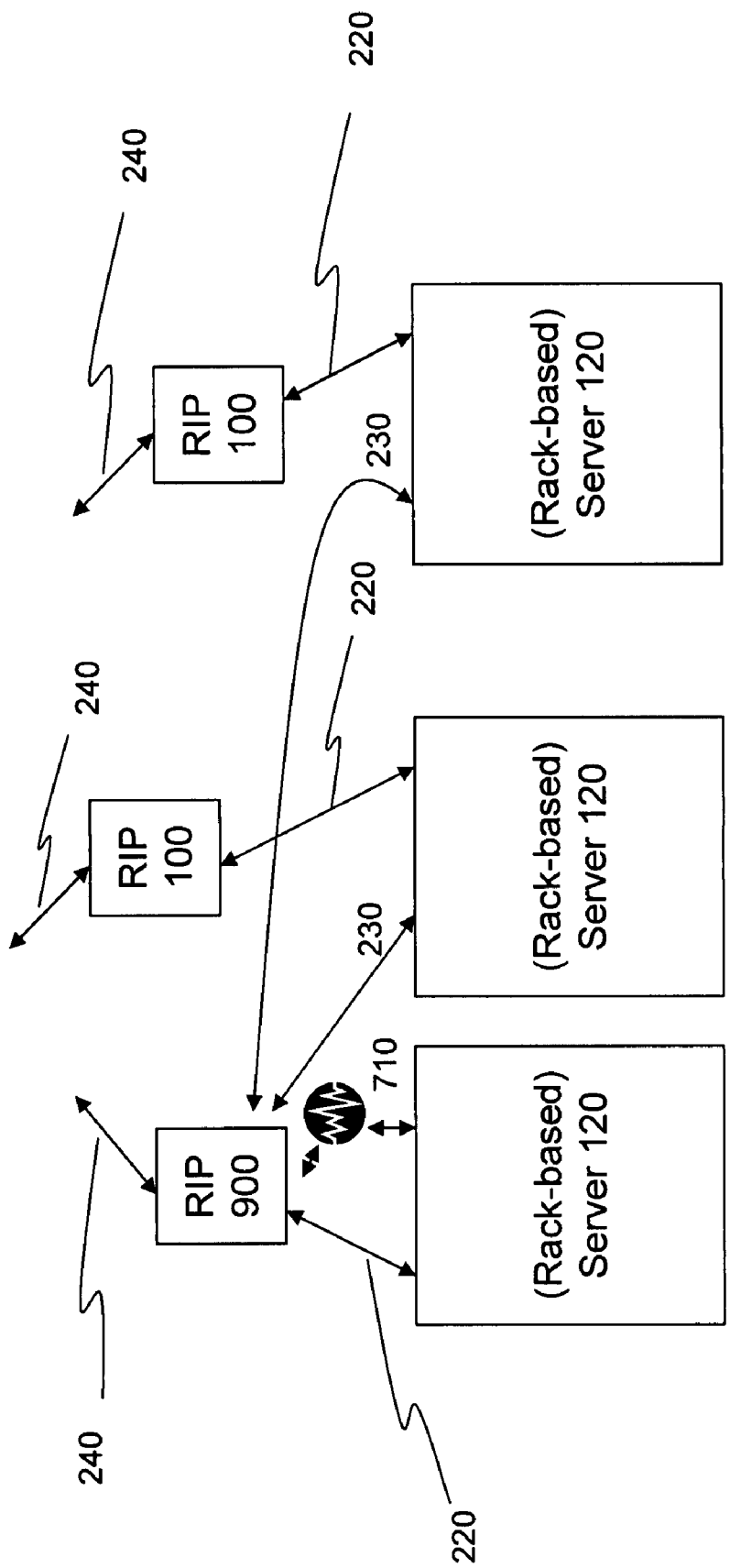
FIG. 9 is a connection-level diagram representing various connections of a RIP having a wireless connector and plural wired connectors such as may be used in conjunction with RIPs that do not themselves have information connectors therein.

Instead of a RIP 200 including a dedicated information connector 230 per server, in an alternate embodiment, as shown in FIG. 9, a RIP 900 instead includes plural information connectors 230 and optionally a wireless interface for receiving wireless electromagnetic radiation 710 (e.g., radio-wave-based or infrared-based signals). In such a configuration, the RIP 900 can multiplex video from one server 120 and information from plural ISI-based processors (over connectors 230 and/or using electromagnetic radiation 710). In such a configuration, there may only need to be one RIP 700 per rack or per several servers 120, as shown in FIG. 9. However, in such a configuration, the INP 210 may need to be configured to know the correspondence between the received video signals and the ISI-based processors.

Similarly, while the above descriptions have been made with reference to a RIP receiving video signals from only a single server, it is also possible to utilize a RIP that receives video signals from plural servers and information messages from one or more ISI-processors. For example, a "two-by" RIP may include two user interface connectors 220 and two information connectors 230 in a single housing. As would be understood, "n-by"s, where "n" is greater than or equal to three are also possible.

The INP 210 and the ISI processor of a server may utilize either polling or "push" technology. That is, the INP 210 can be configured or programmed to periodically poll each of the servers 120 to which it is connected (or their corresponding RIPs) to determine and store the status of those servers, or the ISI processors of the servers may periodically push to the INP 210 (or the RIP associated with the server) status messages indicating their health. The INP 210 may also use a combination of polling and push technology in the case that some servers 120 are configured differently than others.

Figure 10A:
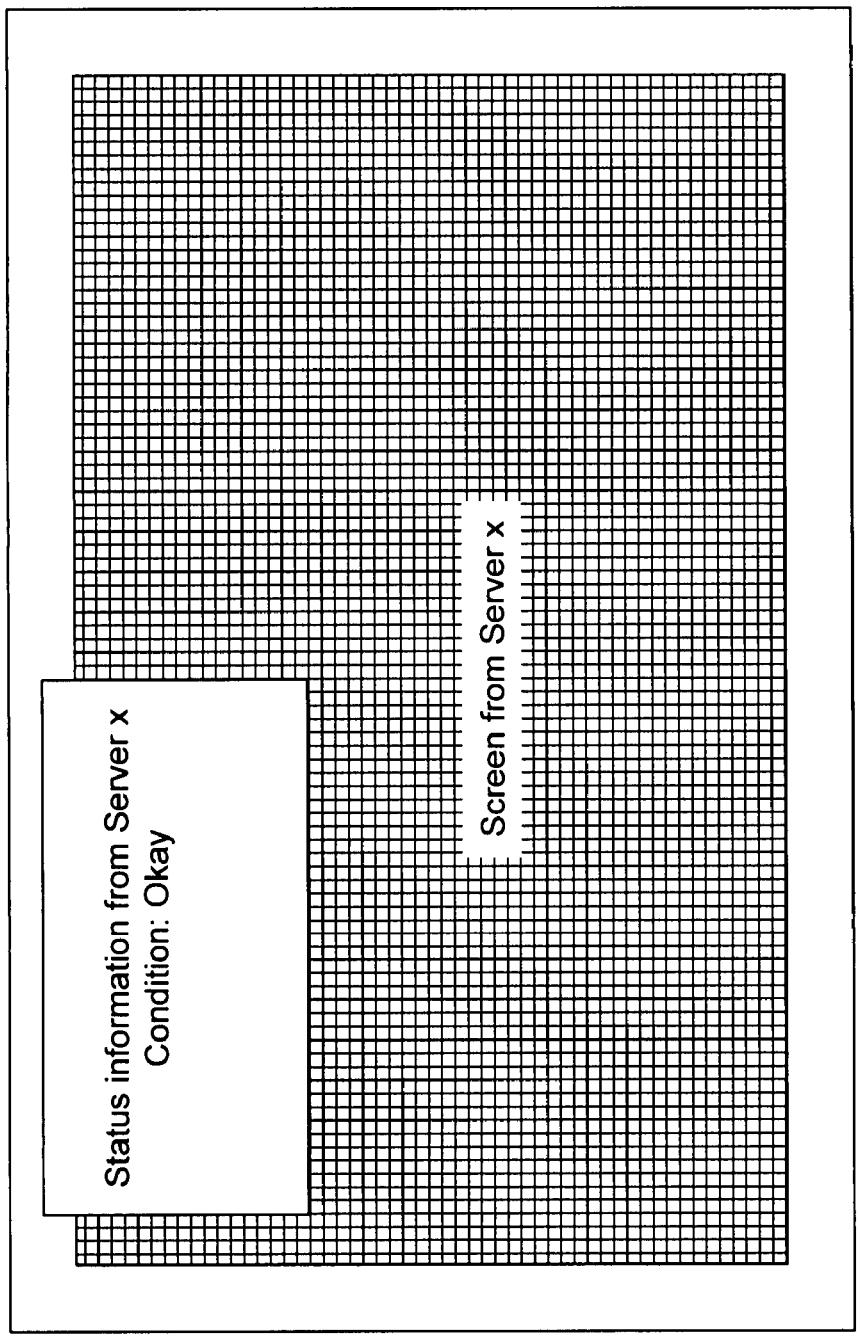
FIG. 10a is an illustrative representation of a screen showing status information about a remote server superimposed on video from that server.

The INP 210 can poll for status information periodically, at a user request, or both. For example, as shown in FIG. 10*a*, while looking at a screen of server "x", the user (at remote computer 190 or at a local computer interface connected via a KVM interface connector 250) may perform an action (e.g., select a hot-key or utilize a special mouse click or mouse position) to signify that the user wishes to see status information. If "current" status information is available for that server, then the remote computer 190 or the INP 210 displays the status information on a computer monitor at either the remote computer or the local computer interface. The display of this information can be in any form compatible with the user's monitor or display, such as in the form of a window or a window overlay for the remote computer and in the form of a partial- or full-screen overlay in the case of a local computer interface. (In the case of a local computer interface, the same on-screen display circuit that is used for selecting which server is to be the "active" server can also be used for generating the status information. Alternatively, a separate on-screen display circuit can be used for status information if desired.)

Figure 10B:
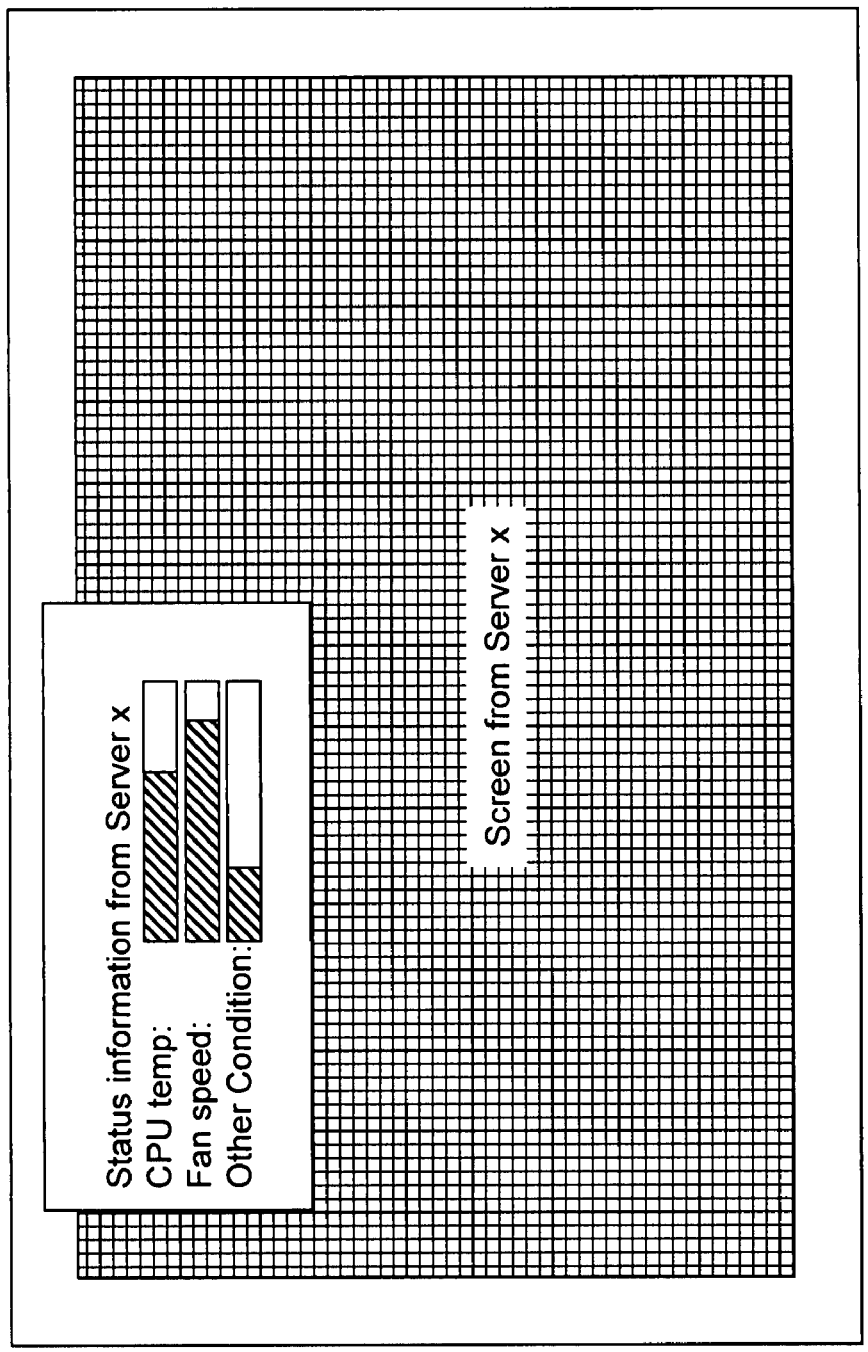
FIG. 10b is an illustrative representation of a screen showing status information (represented textually and graphically) about a remote server superimposed on video from that server.

In the embodiment shown in FIG. 10*a*, the information is displayed as text. In the embodiment shown in FIG. 10*b*, the information is displayed as a combination of text and graphics (which may be in color to represent various conditions such as blue for cool, red for over-heating or an error, etc.). If the status information for the selected server is not "current" or if the status information has not previously been requested or received, the INP 210 requests the status information from the server 120 and displays it upon receipt. (As should be appreciated, the age of status information which can still be considered "current" may be user-configurable.) While the status information is being displayed, the INP may request and/or receive additional status information so that a user sees a continuously updated set of status information.

Figure 11:
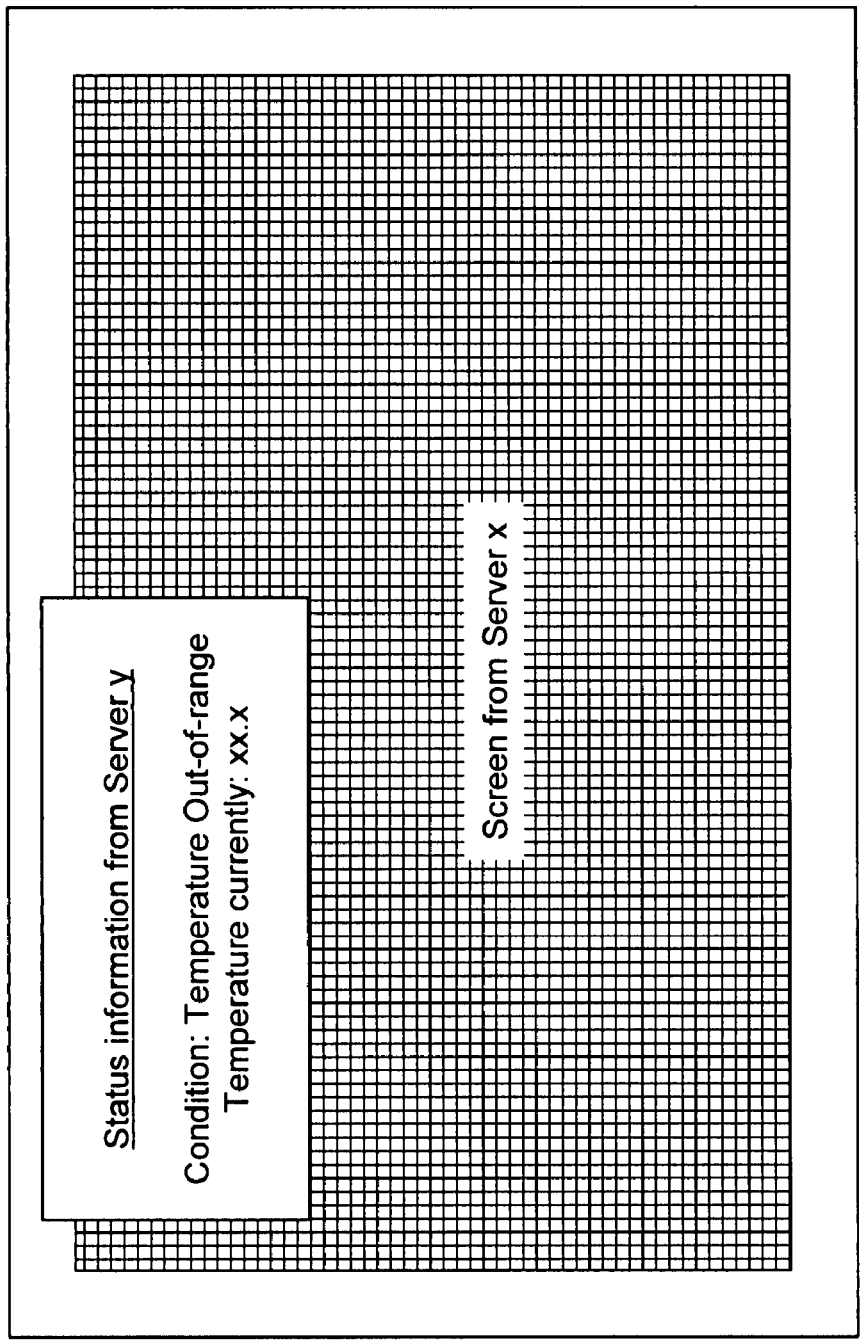
FIG. 11 is an illustrative representation of a screen showing status information about a first remote server superimposed on video from a second remote server.

As shown in FIG. 11, in the event that a portion of the signals received by the INP 210 indicates that one of the servers 120 requires attention or is malfunctioning (e.g., because ISI status information indicates an overheating processor or there is an intrusion alert such as an opened case or a number of incorrect attempts to access baseboard or chassis components), a message can displayed on the computer monitor of the corresponding user, without requiring user intervention. For example, in the case of a remote computer 190, the program monitoring the output of the INP 210 may cause a window to pop-up or a message on an existing window to be displayed. In the case of a local computer interface, the INP 210 may cause a message to be displayed on the local video monitor (e.g., using on-screen programming to overwrite a portion of the video image being output by the INP 210). By using a local computer interface on the INP 210, a separate computer (e.g., remote computer 190) is not needed, only a connection to an analog or digital monitor and a connection to the controlling peripheral device.

Using a remote computer 190 or a local computer interface, other text or icons can be periodically or continuously displayed on a portion of the screen in order to give the user a summary of the status of various servers. For example, an icon of a computer with a number or name inside it can be displayed for each server monitored by the INP 210 and color-coded to identify whether the server is operating normally or malfunctioning. Alternatively, a ticker tape-style display can scroll along a portion of the display (either horizontally or vertically) and display updating information about the servers at a selected rate.

The INP 210 can also be configured or programmed to contact a user (e.g., a system administrator) using alternate connection technology. For example, the INP 210 can generate and send one or more emails to selected or configured addresses notifying the recipient(s) of the problem and identifying the server experiencing the problem. Similarly, recipients can be contacted using one-way or two-way paging messages, Instant Messaging-style messages or even a voice call using pre-recorded messages.

Because an INP 210 receives both video and informational messages (e.g., ISI-based messages), the INP 210 can coordinate the video and informational messages such that a remote user can better understand what was happening or what happened when the error occurred. In one embodiment of an INP 210 or a RIP 200, circuitry or programming is included which captures the current video image when an informational message is received that indicates an error condition. For example, if an ISI-based message is received that indicates that a processor is overheating and being shut-down, the video circuitry in an INP 210 or a RIP 200 can save the image on the screen in case the image may provide some additional insight into why there was a problem. In an operating system environment that supports providing a list of running tasks, a remote user may be able to determine some additional information if that list of running tasks is captured in the video image when the error message is received. In the case of a core dump or a "blue screen" that occurs along with an informational message, the remote user may be able to see that information instead.

In addition to the status information that can be read from a server being monitored, the video processing system described herein can further remotely perform administrative functions on the server. For example, the user (either directly or via the INP) can instruct a selected server to be "rebooted" or to have its power "cycled" such that it re-starts, e.g., when the server has "crashed" or is "hung."

Commands received by the INP 210 and/or the RIPs (200, 700, 900, etc.) are processed in order to determine if the commands are to be processed locally or are to be passed on. For example, a command from a user to switch active servers is processed by the device capable of handling the switch command (e.g., the INP) and not passed on to the server because the server would not understand it. Similarly, a command to set the frequency that information is to be transmitted by a RIP or INP is processed by those devices respectively and not passed further on. Also, a command to set an error threshold (e.g., a temperature above which an error should be automatically reported) is processed at a corresponding filtering device and not passed further on. The code (or hardware configuration in the case of FPGA-like devices) of the INPs and RIPs may also be updated remotely, e.g., by uploading a file to the device and "rebooting" the device or by instructing the device to download a particular file and "reboot."

While the above description has been given in terms of various processors inside the RIP 200 and the INP 210, it should be understood that the functionality of more than one logical processor can be combined into a single processor. For example, the KVM processor 310 and the ISI processor 320 may simply be different programs running on the same physical processor or different routines within the same program. Also, while the above description has been given in terms of circuitry, programming, logic and hardware, it should be understood that the amount of circuitry, programming and logic can be changed, depending on how the devices, such as those described herein, are to be built. For example, more circuitry and less programming can be used as the amount of integration increases in integrated circuit design. Alternatively, a minimum amount of circuitry (e.g., just A/D and D/A converters and communications hardware) can be used along with a greater amount of programming if the internal design of the system (e.g., the types of messages and the protocols for handling them) is expected to change over the lifetime of the device(s). Other exemplary hardware includes a processor running code loaded from a non-volatile (and potentially reprogrammable) memory, a custom ASIC, and a one-time programmable or a reprogrammable logic device, such as a GAL, FPGA or the like.

While the above has described various connectors for use in various devices, it should be understood that embodiments of some such connectors may require additional circuitry to pre-process or post-process the signals received from or sent to the communications media to which they are connected. Such circuitry may include, but is not limited to, drivers, wave shapers, filters, packetizers, de-packetizers and optical converters.

While certain configurations of structures have been illustrated for the purposes of presenting the basic structures of the present invention, one of ordinary skill in the art will appreciate that other variations are possible which would still fall within the scope of the appended claims.

I claim:

1. A video processor, comprising:
a housing, the housing including:
first and second video connectors for receiving video signals from a first computer and a second computer, respectively, both the first and second computers being external to the housing;
a first information connector for receiving informational signals representing status or configuration information from a first processor in the first computer but other than a main processor of the first computer;
a second information connector for receiving informational signals representing status or configuration information from a second processor in the second computer but other than a main processor of the second computer; and
an IP-based communications controller for transmitting via a communications port first signals representing at least a portion of the video signals received from the first and second computers across the first and second video connectors and second signals representing at least a portion of the informational signals received from the first and second computers across the first information connector and the second information connector, wherein the IP-based communications controller comprises priority determination logic for determining that the first signals take priority over the second signals when the second signals indicate normal operation of the first and second computers.

2. The video processor as claimed in claim 1, wherein the informational signals comprise IPMI-based messages.

3. The video processor as claimed in claim 1, wherein at least one of the first and second video connectors comprises an analog video connector.

4. The video processor as claimed in claim 1, further comprising at least one peripheral connector for transmitting to the first computer signals from a peripheral device remote from the first computer.

5. The video processor as claimed in claim 1, wherein the first information connector comprises a connector for receiving a cable.

6. The video processor as claimed in claim 1, wherein the first information connector comprises a connector for connecting to a wireless interface.

7. The video processor as claimed in claim 1, wherein the IP-based communications controller comprises priority determination logic for determining that the second signals take priority over the first signals when the second signals indicate abnormal operation of at least one of the first and second computers.

8. A video processing system, comprising:
(a) a housing, the housing including:
first and second video connectors for receiving video signals from a first computer and a second computer, respectively, both the first and second computers being external to the housing;
a first information connector for receiving informational signals representing status or configuration information from a first processor in the first computer but other than a main processor of the first computer;
a second information connector for receiving informational signals representing status or configuration information from a second processor in the second computer but other than a main processor of the second computer; and
an IP-based communications controller for transmitting via a communications port first signals representing at least a portion of the video signals received from the first and second computers across the first and second video connectors and second signals representing at least a portion of the informational signals received from the first and second computers across the first information connector and the second information connector; and (b) a display controller for receiving the first and second signals from the IP-based communications controller for causing the first signals and the second signals to be displayed on a computer monitor; and video capture circuitry for capturing video signals from an abnormally operating computer of the first and second computers when the second information corresponding to the abnormally operating computer indicates that the abnormally operating computer is operating abnormally.

9. The video processing system as claimed in claim 8, wherein the second signals are superimposed on the computer monitor over the first signals.

10. The video processing system as claimed in claim 8, wherein the display controller causes the second signals corresponding to the second computer to be overlaid over the first signals corresponding to the first computer when the second signals corresponding to the second computer indicate an abnormal condition in the second computer.

11. The video processing system as claimed in claim 8, wherein the display controller causes summaries of status information corresponding to the first and second computers to be displayed and updated on a monitor connected to the display controller.

12. The video processing system as claimed in claim 8, wherein the informational signals comprise IPMI-based messages.

13. The video processing system as claimed in claim 8, wherein at least one of the first and second video connectors comprises an analog video connector.

14. The video processing system as claimed in claim 8, further comprising at least one peripheral connector for transmitting to the first computer signals from a peripheral device remote from the first computer.

15. The video processing system as claimed in claim 8, wherein the first information connector comprises a connector for receiving a cable.

16. The video processing system as claimed in claim 8, wherein the first information connector comprises a connector for connecting to a wireless interface.

17. A video processor, comprising:
a housing, the housing including:
first and second video connectors for receiving video signals from a first computer and a second computer, respectively, both the first and second computers being external to the housing;

a first information connector for receiving informational signals representing status or configuration information from a first processor in the first computer but other than a main processor of the first computer;

a second information connector for receiving informational signals representing status or configuration information from a second processor in the second computer but other than a main processor of the second computer;

an IP-based communications controller for transmitting via a communications port first signals representing at least a portion of the video signals received from the first and second computers across the first and second video connectors and second signals representing at least a portion of the informational signals received from the first and second computers across the first information connector and the second information connector; and an information processor wherein the information processor controls the IP-based communications controller to send out the second signals at a substantially lower rate than the informational signals are received from the first and second information connectors when the second signals indicate normal operation of the first and second computers.

18. The video processor as claimed in claim 17, wherein the information processor controls the IP-based communications controller to send out the second signals without filtering when the second signals indicate abnormal operation of at least one of the first and second computers.

19. The video processor as claimed in claim 17, wherein the informational signals comprise IPMI-based messages.

20. The video processor as claimed in claim 17, wherein at least one of the first and second video connectors comprises an analog video connector.

21. The video processor as claimed in claim 17, further comprising at least one peripheral connector for transmitting to the first computer signals from a peripheral device remote from the first computer.

22. The video processor as claimed in claim 17, wherein the first information connector comprises a connector for receiving a cable.

23. The video processor as claimed in claim 17, wherein the first information connector comprises a connector for connecting to a wireless interface.

* * * * *